United States Patent
McClune et al.

(10) Patent No.: US 11,157,492 B2
(45) Date of Patent: *Oct. 26, 2021

(54) GENERIC SCHEDULING

(71) Applicant: Salesforce.com, Inc., San Francisco, CA (US)

(72) Inventors: Stuart Douglas McClune, Rothesay (CA); Michael Gordon Luff, Killarney Road (CA)

(73) Assignee: salesforce.com, inc., San Francisco, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 16/284,211

(22) Filed: Feb. 25, 2019

(65) Prior Publication Data

US 2019/0258626 A1   Aug. 22, 2019

Related U.S. Application Data

(63) Continuation of application No. 14/833,651, filed on Aug. 24, 2015, now Pat. No. 10,216,694.

(51) Int. Cl.
| | |
|---|---|
| *G06F 16/245* | (2019.01) |
| *G06F 16/28* | (2019.01) |
| *G06F 16/951* | (2019.01) |
| *G06Q 50/00* | (2012.01) |
| *H04L 12/58* | (2006.01) |

(52) U.S. Cl.
CPC .......... *G06F 16/245* (2019.01); *G06F 16/285* (2019.01); *G06F 16/951* (2019.01); *H04L 51/16* (2013.01); *H04L 51/26* (2013.01); *H04L 51/32* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,418,433 B1 * | 7/2002 | Chakrabarti | G06F 16/951 |
| 9,710,567 B1 * | 7/2017 | Lobdell | H04L 65/403 |
| 2008/0147616 A1 | 6/2008 | Larsson | |
| 2009/0119268 A1 | 5/2009 | Bandaru | |
| 2011/0302148 A1 * | 12/2011 | Kakade | G06F 16/955 |
| | | | 707/710 |
| 2012/0254152 A1 | 10/2012 | Park | |
| 2013/0179424 A1 * | 7/2013 | Xu | G06Q 30/0241 |
| | | | 707/710 |
| 2014/0006438 A1 | 1/2014 | Singh | |

(Continued)

*Primary Examiner* — Robert W Beausoliel, Jr.
*Assistant Examiner* — Cheryl M Shechtman
(74) *Attorney, Agent, or Firm* — Butzel Long; Donald J. Lecher

(57) ABSTRACT

A system and method for customized scheduling of sources, including breaking down a source of content into at least two categories, including posts and engagements, and gathering content related to a specific source. A scheduler handles scheduling of posts and engagement for a single source and entities that are due to be crawled are sent to a scheduling queue, in which each content type for a source can have its own queue. A process points to the correct scheduler queue in order to request content to be crawled, attaches to the proper queue, processes requests, queries the social network for content, parses the response and sends any new data to be saved to the system.

20 Claims, 1 Drawing Sheet

(56) References Cited

U.S. PATENT DOCUMENTS

2015/0379406 A1* 12/2015 Savage ................. G06N 5/04
 706/11
2017/0075990 A1* 3/2017 Leu ................. G06F 11/3409

* cited by examiner

GENERIC SCHEDULING

BACKGROUND

A search engine is a tool that identifies documents, typically stored on hosts distributed over a network, that satisfy search queries specified by users. Web-type search engines work by storing information about a large number of web pages or documents. These documents are retrieved by a web crawler, which then follows links found in crawled documents so as to discover additional documents to download. The contents of the downloaded documents are indexed, mapping the terms in the documents to identifiers of the documents and the resulting index is configured to enable a search to identify documents matching the terms in search queries. Some search engines also store all or part of the document itself, in addition to the index entries.

In such web-type search engines, web pages can be manually selected for crawling, or automated selection mechanisms can be used to determine which web pages to crawl and which web pages to avoid. A search engine crawler typically includes a set of schedulers that are associated with one or more segments of document identifiers (e.g., URLs) corresponding to documents on a network (e.g., WWW). Each scheduler handles the scheduling of document identifiers for crawling for a subset of the known document identifiers. Using a starting set of document identifiers, such as the document identifiers crawled or scheduled for crawling during the most recent completed crawl, the scheduler removes from the starting set those document identifiers that have been unreachable in one or more previous crawls. Other filtering and scheduling mechanisms may also be used to filter out some of the document identifiers in the starting set, and schedule the appropriate times for crawling others. As such, any number of factors may play a role in filtering and scheduling mechanisms.

Accordingly, a need exists for a generic scheduling process that addresses these variables and allows for customized scheduling of such sources, including gathering content related to a specific source.

BRIEF SUMMARY

According to implementations of the disclosed subject matter, a system and method is provided for a generic scheduling process for use in computer network systems. According to one implementation of the disclosed subject matter, a system and method is provided that allows for customized scheduling of sources, hereinafter referred to as managed account-type sources, including gathering content related to a specific source.

To do so, an implementation of the disclosed subject matter is provided to break down a source of content from a social network into at least two categories, including posts which represent top level content, and engagements which represent content driven from top level content ingested into the system and which has an associated ID (i.e., comments, replies, and so forth).

An implementation of the disclosed subject matter is also provided to control a scheduler, hereinafter referred to as a managed account scheduler, to handle scheduling of posts and engagements for a single managed account-type source (e.g., Google+®, LinkedIn®, and the like).

An implementation of the disclosed subject matter is also provided to send entities that are due to be crawled to a scheduling queue, such as a Redis Queue, in which each content type (e.g., posts and engagements) for a managed account may have its own queue within the scheduling queue that the scheduler will send entities to, based on the type of entity being scheduled. Herein, an entity may be any source of content from a social network, but is not limited thereto.

An implementation of the disclosed subject matter is also provided to control a process, hereinafter referred to as a managed account worker process, to point to a queue within the scheduling queue in order to request content of the scheduler queue to be crawled. For each managed account, there may be two managed account worker process instances running, one for each content type within the managed account.

An implementation of the disclosed subject matter is also provided to control a managed account worker process to attach to the proper scheduling queue, process the request, query the social network for content, parse the response and send any new data to another process, hereinafter referred to as a batch insert process, to be saved to the system. Any associated dynamics may also be updated if the managed account worker process is processing engagements-type posts.

Accordingly, implementations of the disclosed subject matter provide a generic scheduling process that manages when a particular external entity is due to be crawled. An external entity may be any source of content from a social network and is broken down into two categories, including posts and engagements. Each managed account scheduler may handle scheduling of posts and engagements for a single managed account-type source, and entities that are due to be crawled may be sent to a scheduling queue in a format, and each content type for a managed account may have its own queue within the scheduling queue that the scheduler will send entities to, based on the type of entity being scheduled.

Implementations of the disclosed subject matter further provide a managed account worker process that attaches to the proper scheduling queue, processes the request, queries the social network for content, parses the response, and sends any new data to a batch insert process to be saved to the system. The managed account worker process points to the correct scheduler queue within the scheduling queue in order to request content to be crawled. For each managed account, there can be two managed account worker process instances running, one for each content type within the managed account.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter. No attempt is made to show structural details in more detail than may be necessary for a fundamental understanding of the disclosed subject matter and various ways in which it may be practiced.

DETAILED DESCRIPTION

Figure 1:
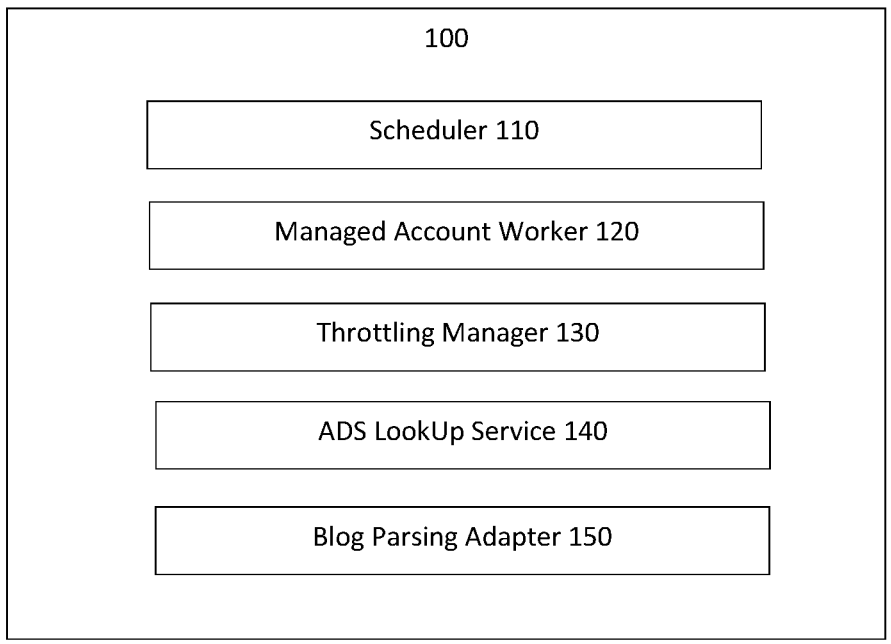
FIG. 1 shows an illustrative high level overview of the generic scheduling process described, according to an implementation of the disclosed subject matter.

Implementations of the disclosed subject matter provide a system and method for a generic scheduling process that allows for customized scheduling of sources, hereinafter referred to as managed account-type sources, including breaking down a source of content into at least two categories, including posts and engagements, and gathering content related to a specific source. A scheduler, hereinafter referred to as a managed account scheduler, is provided to handle scheduling of posts and engagements for a single managed account-type source, and entities that are due to be crawled are sent to a scheduling queue, such as a Redis Queue, in which each content type for a managed account can have its own queue. A process, hereinafter referred to as a managed account worker process, may be provided to point to the correct queue within the scheduling queue in order to request content to be crawled, attach to the proper scheduling queue, process the request, query the social network for content, parse the response and send any new data to be saved to the system.

As noted, a search engine crawler typically includes a set of schedulers that are associated with one or more segments of document identifiers corresponding to documents on a network. Each scheduler handles the scheduling of document identifiers for crawling for a subset of the known document identifiers. Using a starting set of document identifiers, such as the document identifiers crawled or scheduled for crawling during the most recent completed crawl, the scheduler removes from the starting set those document identifiers that have been unreachable in one or more previous crawls. As known to those skilled in the art, "crawling" is a term associated with the systematic browsing of sites, typically for the purpose of indexing content. Implementations of the disclosed subject matter provide a generic scheduling process that manages when a particular external entity is due to be crawled. An external entity can be any source of content, such as content from a social network, and which can be broken down into categories, such as posts which represent top level content, and engagements which represent content driven from top level content ingested into the system and which have an associated ID (i.e., comments, replies, and so forth). In the following description, data for the managed accounts can be considered private to a client (i.e., even if the content is considered "public" in the external source). Further, in the following description, endpoints associated with the same content type (i.e., posts or engagements) can be crawled on the same interval, and extended media types can continue to be included on topic profiles to indicate what type of content users have given permission to fetch.

Each managed account scheduler can handle scheduling of posts and engagements for a single managed account-type source (e.g., Google+®, LinkedIn®, and the like), and entities that are due to be crawled can be sent to a scheduling queue in, for example, JavaScript Object Notation (JSON) format. Each content type for a managed account can have its own queue within the scheduling queue that the managed account scheduler will send entities to, based on the type of entity being scheduled, and scheduling engagement for a managed account can be varied depending on how each social network's API returns top level content.

A process, hereinafter referred to as a managed account worker process, may be provided to point to the correct queue within the scheduling queue in order to request content of the queue to be crawled. The managed account worker processes can attach to the proper queue, process the request, query the social network for content, parse the response, and send any new data to the batch insert process to persist to the system. Any associated dynamics can also be updated if the managed account worker is processing engagements-type posts. The details of this is discussed in greater detail below in regard to the scheduler process and managed account worker processes as performed by the generic scheduling process. FIG. 1 shows an illustrative high level overview of the generic scheduling process described, according to an implementation of the disclosed subject matter.

FIG. 1 shows a generic scheduling system 100, including a scheduler 110, managed account worker 120, throttling manager 130, ADS lookup service 140 and blog parsing adapter 150. Each of the scheduler 110, managed account worker 120, throttling manager 130, ADS lookup service 140 and blog parsing adapter 150 may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits, modified data tables and new data tables as specified by the instructions.

The scheduler 110, managed account worker 120, throttling manager 130, ADS lookup service 140 and blog parsing adapter 150 may include or be implemented using hardware that may include a processor, such as a general purpose microprocessor and/or an Application Specific Integrated Circuit (ASIC) that embodies all or part of the techniques according to the disclosed subject matter in hardware and/or firmware. The processor may be coupled to memory, such as RAM, ROM, flash memory, a hard disk or any other device capable of storing electronic information. The memory may store instructions adapted to be executed by the processor to perform the pointing, attachment, processing, querying, parsing and saving data according to the disclosed subject matter.

The managed account scheduling process performed by the generic scheduling system 100, in part, is directed to fetch scheduled managed accounts for ingestions of data, and in some cases, reschedule those accounts. The process takes a managed account-type source as an argument, which can be mapped to a managed account type enumeration upon startup, and breaks down the source of content into posts and engagements, and gathers content related to a specific source. The scheduler 110 schedules posts and engagements for a single managed account-type source, and entities that are due to be crawled are sent to a scheduling queue, such as a Redis Queue, in which each content type for a managed account can have its own queue. The managed account worker 120 points to the correct queue within the scheduling queue in order to request content to be crawled, attaches to the proper scheduling queue, processes the request, queries the social network for content, parses the response and sends any new data to be saved to the system.

According to an implementation of the disclosed subject matter, the scheduler 110 can begin scheduling of posts and engagements for a single managed account-type source by starting two threads, including one for posts and one for engagements, that may be responsible for fetching records from the database based on the managed account-type source. In this case, a thread is a small sequence of programmed instructions that can be managed independently by a scheduler. The scheduler 110 may direct the thread responsible for scheduling posts-type content to query a database for a list of accounts due for crawling from a data source end point table (i.e., content) and associated user database tables to gather user information. The scheduler 110 may direct the thread responsible for engagements-type content to query an active engagement table in a dynamics database and return a list of active engagement objects, which can be extended from scheduled dynamics objects.

The scheduler 110 may also manage what records to fetch by maintaining records that can store the value of the greatest next crawl time that have been fetched for each managed account process type using a configuration (i.e., crawler.$MANAGED_ACCOUNT_PROCESS_TYPE.bpdelta). When the scheduler 110 retrieves records from the database, it may check the scheduling queue to ensure that there is not already a record waiting in the scheduling queue for processing this source; and if not, it may then place them into the scheduling queue in, for example, a first in, first out (i.e., FIFO) basis. This ensures that the system is not filling up the queue with work that is in process, and also ensures that the system is fetching current data from the database, since the managed account worker 120 can potentially be persisting data to the data source endpoint table (i.e., paging cursors and so forth). It can also make a scheduling queue entry in the current work cache to signal that this page is ready for processing such that if the page comes due again for crawling, it will be ignored. The scheduler 110 may then periodically poll the scheduling queues to determine when it is time to place more items in the queues (i.e., based on a configurable threshold).

The scheduler 110 may also monitor data source and active engagement objects, which may have a list of managed account endpoint objects attached to them which represent the list of endpoints needed to collect data for a scheduled entity. The endpoint record may contain the ID, name and list of parameters associated with the endpoint. The endpoints to include may be based on the extended media types associated with a topic filter for the managed account due to be crawled, which may be stored in a topic filter extended media type attribute assignment table. The scheduled objects may then be encapsulated within a scheduled endpoint and transformed into JSON format and added to a queue within the scheduling queue. Once added to the queue, the scheduler 110 may update the associated data source endpoint record for the thread handling posts level content with the next fetch time.

For engagements-type content, if the social network supports notification of new comments from within the post API call (i.e., each post returned has a comment count returned), the scheduler 110 may update the next fetch time in the active engagement table to null. By setting the next fetch time in the active engagement table to null, fetching comments for that particular post will not occur until the managed account worker process updates the next fetch time when it determines that there is new content. For social networks that do not support notifications of new comments from within the post API call, the scheduler 110 may reschedule the post using the check rate ID.

The scheduler 110 may also adjust schedule for content for social networks that implement user-based rate limits. This avoids cases where the volume of content scheduled is estimated to be greater than the quota given to a user. In this type of situation, the schedule may become backed-up and latency begins to increase, especially for comments on new posts. To avoid this situation or recover from being in this state, the scheduler 110 may periodically run a task that may query the active engagement table by ID, grouped by and summed by check rate ID, to get a total number of records for each check rate. Based on the sums for each check rate, the scheduler 110 can estimate the total number of API calls needed to service the current schedule. If the estimate is over the threshold for a user for the given social network, the scheduler 110 can reduce the frequency of the posts within each check rate using, for example, a sliding scale for priority, and update each post's schedule in the dynamics ADS active table by adjusting the associated times used for go-forward scheduling of a source (e.g., blog) by updating the dynamics check rate lookup table. When attempting to reschedule engagements-type content for rate limiting, implementations of the disclosed subject matter may query the dynamics ADS active table, which may become large. In some cases, implementations of the disclosed subject matter can select records from this for a specific managed account-type source and update records to new crawl times if an update is needed.

The scheduler 110 may also signal if a thread should be started to look for notification-type records to be used to modify schedules. To do so, the thread can load up a class from a thread factory, and the implementation can be performed inside the class received from the thread factory. This implementing class ties into the rescheduled method and is synchronized with regular rescheduling calls so that records are not overwritten.

Returning to FIG. 1, a managed account worker process is created by the managed account worker 120 that takes the managed account-type source as an argument. Based on command line argument, the managed account worker 120 directs the worker process to register with the throttling manager 130 over a socket. The throttling manager 130 responds with an information object which tells the managed account worker process where to request its token when attempting to make an API request to a social network. Before making a request to a social network, the managed account worker 120 may be required to register with the centralized throttling manager 130 to determine if there is available API quota to make a request. Further, a new package can be created to host client code associated with a social network, which enables implementations of the disclosed subject matter to remove specific social network related calls from any worker type codebase.

The managed account worker 120 configures itself to point to the correct queue (i.e., key) within the scheduling queue in order request content to be crawled. For each managed account, there can be two managed account worker process instances running, one for each content type within the managed account. If the content type of the managed account worker process is engagements, in another task, the managed account worker 120 maintains a list of current accounts locally for the managed account type by periodically requesting the list from the ADS lookup service 140. This obtains any authorization information (i.e., access tokens) to make API calls to fetch engagements level content.

The managed account worker 120 may then begin to request content from the scheduling queue, and parsing the scheduled endpoint it receives. The managed account worker 120 passes this object off to a processing class, which in turn, can start threads, each from an endpoint factory class for each endpoint within the object. These endpoint processing threads (e.g., custom processor classes) can be responsible for creating a client class to the social network, also from the thread factory, building the URL for the endpoint with any dynamic information, and then invoking the client call to retrieve the data which includes any paging and the like. For social networks that are not using check rates to schedule engagement, an insert process of the managed account worker 120 may update an active engagement table when it determines that there is new engagement content available.

Responses from the client may be against an interface which can then be sent to the blog parsing adapter 150 for that endpoint. The blog parsing adapter 150 may be responsible for blog and blog post mappings, including client ID, sending them to the batch insert process to persist to the database, and any other custom actions for that source (i.e., storing cursor values and so forth), including any inserts/updates related to dynamics.

The ADS lookup service 140 may be modified to periodically poll the user database for new accounts and insert into or update a data source table as required. To do so, the service 140 may fetch accounts for a managed account type from the data source table and query the ADS tables in the user database for active accounts. For each source that is in both queries, the process can update the associated data source record with an active flag (e.g., active=1). For records that do not appear in the user database fetch, the service 140 can update the associated record in the data source table to inactive (e.g., active=0). The active flag can be used by the scheduling process in order to filter out inactive accounts when sending pages to be crawled.

The ADS lookup service 140 may also manage the active flag on associated data source endpoint records depending on what is returned for the active topic filters associated with the data source. This allows the scheduler 110 to filter out scheduling specific endpoints that are not to be crawled based on which extended media types the end user has given permission. Regarding subpage-like content, implementations of the disclosed subject matter can create another data source record with parent data source ID and store the ID of the subpage as the external ID, and add endpoint type ID to indicate if this is used to find new records for data source or for blog post content.

The ADS lookup service 140 may also make available the list of accounts for each managed account-type source to other services upon request (i.e., over socket). A new cached data type may be assigned for each new managed account-type source. To do this, a new object may be created to contain data specific to a social network, and which extends the base data source object. The ADS lookup service 140 may also periodically calculate current user limits based on a configurable interval for accounts that are rate-limited based on user. A new cached data type may be created that contains current rate limiting information for a user within a managed account. The scheduler 110 uses this information stored by the service 140 to alter schedules as previously outlined in the scheduler process description. This information may also be used by the centralized throttling process of the throttling manager 130 to adjust throttling for users within a managed account. A general formula to calculate actual user limit is given below in Equation (1):

$$\text{Actual User Limit=Application Daily Quota/Number of Current Users} \quad (1)$$

If this number is less than the given user quote stated by the social network, an alarm may be generated, which can indicate that the application daily quota is not high enough for the number of current users to ensure maximum API hits per user. The actual user rate limit based on this calculation can be the actual rate limit used for centralized throttling and scheduling manipulation.

As noted above, the blog parsing adapter 150 sends any new data to the batch insert process to persist to the system, and the insert process may be modified to insert records into the new active engagement table. In order to insert records into this new table, a managed account type ID, such as a client ID, is preferably placed into SID (SphinxIndexData). The insert process may also insert records into an engagement comment summary table. If a top level post is "commentable" (i.e., generates next level content), storage can be performed by media providers. Accordingly, implementations of the disclosed subject matter look up the media provider when reading from SID, to see if it has comment media provider ID, and this may be flagged by the insert process.

Implementations of the disclosed subject matter may also provide the following crawler processes with features to support the generic social account framework of the disclosed subject matter. As noted above, a crawler typically includes a set of schedulers that are associated with one or more segments of document identifiers corresponding to documents on a network. Each scheduler handles the scheduling of document identifiers for crawling for a subset of the known document identifiers. Implementations of the disclosed subject matter provide crawler processes including, but not limited to, noise classification, sentiment processing, language processing, region profiling, duplicate checks, GI (Global Index) and duplicate databases and blog crawler scheduler.

As managed account data is not subject to noise classification, this flag may be set to false on the blog object to ensure noise classification is not performed (e.g., performNoiseClassification=false). Regarding sentiment processing, sentiment is currently run on posts with a language of 1, excluding rich media or twitter posts classified with language of 1 or 0. Further regarding language processing, language classification by post is run on each post. The default for media types, excluding Twitter®, Facebook®, Forums® or Rich Media®, is to run classification on the post and if the classifier returns "−1" (e.g., could not determine language) then, if language accuracy on blog=100 (e.g., was set by feed util), default to blog language ID or otherwise, set language ID to 0. Regarding region profiling, region is currently determined by custom built profiling adpaters if there is data available on the feed to help determine region. Without an adapter, posts preferably default to region 235 (i.e., USA). Regarding duplicate checks, there are two types of duplicate checks that may be relevant to implementations of the disclosed subject matter; title and post. Both checks may be reviewed, and title managed accounts data may be excluded from title checks as the titles may be derived from the data. Further, duplicate check methods may be present that already exclude posts with a media type of 15 (i.e., private).

Regarding GI and duplicate database, implementations of the disclosed subject matter may ensure that a client ID is appended to the blog post URL when performing duplicate post checks, and before inserts to GI and duplicate databases. This code may be centralized in an implementation noted below:

com.radian6.sphere.crawler.common.util.
getLinkForCacheAndGICheck( )

In this case, the client ID value may be retrieved from the blog post and appended to the blog post URL as a parameter, such as in the format '?clientid=123456'.

Regarding the blog crawler scheduler, the blog crawler scheduler may manage the scheduled crawling of feeds within implementations of the disclosed subject matter, such that managed accounts blogs are not added to the schedule. Code modification in the blog schedule utility class ensures that any blog with a private data media type is not scheduled.

Figure 2:
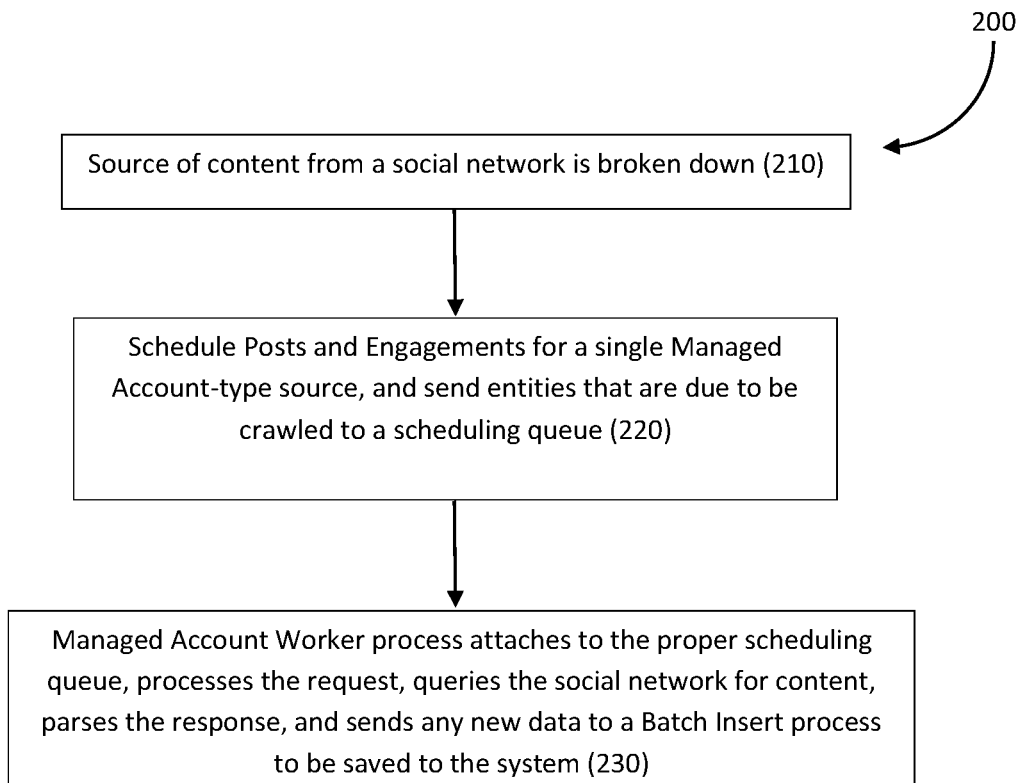
FIG. 2 shows an illustrative flow chart depicting operations of a generic scheduling process for customized scheduling of managed account-type sources according to an implementation of the disclosed subject matter.

FIG. 2 is a flow chart illustrating a generic scheduling process 200 for customized scheduling of managed account-type sources according to implementations of the disclosed subject matter. In a first step 210, a source of content from a social network is broken down into at least two categories, including posts which represent top level content, and engagements which represent content driven from top level content ingested into the system and which have an associated ID (i.e., comments, replies, and so forth). In one implementation, the scheduler 110 may start a number of threads based on the content categories, including a first thread for top level content, and a second thread for content driven from top level content, that may be responsible for fetching records from the database based on the managed account-type source. The first thread can query a database for a list of accounts due for crawling from a data source end point table (i.e., content) and associated user database tables to gather user information. The second thread can query an active engagement table in a dynamics database and return a list of active engagement objects. The scheduler can then send a source identified by the threads to the scheduling queue based on a record of crawl time values for each of the the content categories of the source.

In a second step 220, the scheduler 110 may schedule posts and engagements for a single managed account-type source (i.e., GOOGLE+® computer software. LINKEDIN® online business networking services, and the like), and send sources that are due to be crawled to a scheduling queue, in which each content type for a managed account can have its own queue within the scheduling queue that the scheduler will send entities to, based on the type of source being scheduled. The scheduler 110 may also check the scheduling queue for the source, prior to adding the source to the scheduling queue for crawling, and poll the scheduling queue to determine when to place more sources in the scheduling queue. Once added to the queue, the scheduler 110 may update the associated data source endpoint record for the first thread handling posts or top level content with the next fetch time. The scheduler 110 may also update the second thread when a source added to the scheduling queue supports notifications of new comments from within a post application programming interface call. If the source does not support notifications of new comments from within a post application programming interface call, the scheduler 110 is configured to reschedule the source.

In a third step 230, the worker process of the managed account worker 120 may point to a queue to request a source to be crawled, and a first worker process may be directed to the first content category and a second worker process may be directed to the second content category. In this case, there can be two managed account worker process instances running, one for each content type within the managed account, and which attach to the proper scheduling queue, process the request, query the social network for content, parse the response and send any new data to the batch insert process to be saved to the system. That is, the worker process is configured to direct a client call to retrieve data from the source, and any associated dynamics can be updated if the worker process is processing engagements-type posts.

Data Tables

When implemented, modified data tables and new data tables as specified by the instructions, may be provided. The following tables are created and/or modified through the operations of the generic scheduling system 100, including scheduler 110, managed account worker 120, throttling manager 130, ADS lookup service 140 and blog parsing adapter 150 described above. According to one implementation of the disclosed subject matter, the following tables 1-8 may be created through the operations of the generic scheduling system 100, and the following existing tables 9-12 may be modified through the operations of the generic scheduling system 100. In the following descriptions, parenthetical descriptors, such as "blogPostId", "CONTENT TYPE" and "ExtendedMediaTypes" are provided for terms and/or values which may be found in tables 1-21.

A managed account endpoint (ManagedAccountEndPoint) table 1 may be created to store references to endpoints within a social network (e.g., managedAccountType) that can be called from the managed account worker process. The data of table 1 may be broken down by content type (contentType) as well, which determines if it is top level posts-type content or engagements-type content. Table 1 may also store what type of schedule this endpoint uses (i.e., custom or default). The rate limit type denotes what type of rate limiting applies to this particular endpoint (i.e., application of user based).

TABLE 1

| ManagedAccountEndPoint | |
| --- | --- |
| managedAccountEndPointId | int(11), pk (ai) |
| managedAccountTypeId | int(11) |
| contentTypeId | int(11) |
| rateLimitTypeId | tinyint |
| fetchInterval | int(11) |
| name | varchar(50) |
| processorClassName | varchar(256) |
| adapterClassName | varchar(256) |
| configText | text |

A managed account endpoint extended media type association (ManagedAccountEndPointExtendedMediaTypeAssociation) table 2 may be created to store associations between an endpoint and an extended media type (extendedMediaType), which may be used to determine what endpoint(s) are needed when crawling a source for a topic profile.

TABLE 2

| ManagedAccountEndPointExtendedMediaTypeAssociation | |
| --- | --- |
| managedAccountEndpointId | int(11) |
| extendedMediaTypeId | int(11) |

A content type (ContentType) table 3 may be created to store references of different content types, such as posts, engagements and published, and which of these types represents inbound content.

TABLE 3

| ContentType | |
|---|---|
| contentTypeId | int(11) |
| isInbound | tinyint |
| name | varchar(3) |

A rate limit type (RateLimitType) table 4 may be created to store the different rate limit types across the social networks (i.e., application, user-based, and so forth).

TABLE 4

| RateLimitType | |
|---|---|
| rateLimitTypeId | int(11) |
| name | varchar(30) |

A data source endpoint (DataSourceEndpoint) table 5 may be created to store the different data source endpoints across the social networks.

TABLE 5

| DataSourceEndpoint | |
|---|---|
| dataSourceEndPointId | int(11) (ai) |
| managedAccountEndPointId | int(11), fk |
| dataSourceId | int(11), fk |
| nextFetchTime | timestamp NOT NULL DEFAULT '0000-00-00 00:00:00' |
| cursorValue | varchar(100) |
| active | tiny |

An active engagement (ActiveEngagement) table 6 may be created to schedule when posts will be checked for new comments/replies. When a post is ingested, a record may be created in table 6 by the insert (PDInsert) process scheduling the first check, and the scheduler process reads from table 6 to determine which posts are due to be checked.

TABLE 6

| ActiveEngagement | |
|---|---|
| blogPostId | bigint(20) NOT NULL |
| blogId | bigint(20) NOT NULL |
| clientId | int(11) NOT NULL |
| commentCountChange | mediumint(9) NOT NULL DEFAULT '0' |
| commentCountChange1 | mediumint(9) DEFAULT NULL |
| commentCountChange2 | mediumint(9) DEFAULT NULL |
| commentCountChange3 | mediumint(9) DEFAULT NULL |
| commentCountChange4 | mediumint(9) DEFAULT NULL |
| commentCountChange5 | mediumint(9) DEFAULT NULL |
| likeCount | int(11) DEFAULT '0' |
| shareCount | int(11) DEFAULT '0' |
| lastFetchTime | timestamp NULL DEFAULT NULL |
| nextFetchTime | timestamp NOT NULL DEFAULT '0000-00-00 00:00:00' |
| checkRateId | tinyint(2) NOT NULL DEFAULT '1' |
| publishedDate | datetime NOT NULL |
| externalId | varchar(128) DEFAULT NULL |
| managedAccountTypeId | tinyint(2) NOT NULL DEFAULT '0' |
| cursorValue | varchar(50) DEFAULT NULL |
| active | tinyint(1) NOT NULL DEFAULT '1' |

An engagement check rate (EngagementCheckRate) table 7 may be created to store custom check rate IDs (checkRateIds) for each page that will be read by the scheduler process when scheduling a post for the next check. The scheduler process can check this table for records for the blog ID (blogId) of the page being checked and use them if present. If there are no records present, the scheduler process will use default values stored in this table with a blogId=0. Initially, only the default check rate (checkRate) values may exist in table 7 and any custom check rates (checkRates) may be added manually or as a result of user based rate-limit calculations performed by the ADS lookup service 140.

TABLE 7

| EngagementCheckRate | |
|---|---|
| checkRateId | int(11), pk |
| blogId | bigint(20) NOT FULL |
| checkRateTimeInMins | smallint(4) NOT FULL |
| dayCheckRateEnd | tinyint(4) NOT NULL |

An active engagement summary (ActiveEngagementSummary) table 8 may be created to store information about each comment so that dynamics can be calculated without access to the full comment. When a new comment is ingested, the insert (PDInsert) process can create a record in this table with summary information about the comment. When a dynamics update is triggered for a post, the engagement updater (EngagementUpdater) can retrieve comments for the post from this table using the parent post ID (parentPostId) and use them when calculating the new dynamics values.

TABLE 8

| ActiveEngagementSummary | |
|---|---|
| blogPostId | bigint(20) NOT NULL PRIMARY KEY |
| parentPostId | bigint(20) NOT NULL KEY |
| authorHash | int(10) unsigned NOT NULL |
| wordCount | int(11) NOT NULL |
| publishedDate | datetime NOT NULL |

The following existing tables 9-12 may be modified through the operations of the generic scheduling system 100 described above.

A data source (DataSource) table 9 in the content database may be modified to include managed account type ID (managedAccountTypeId), client ID (clientId) and next fetch time (nextFetchTime). The scheduler 110 may fetch sources from the data source (DataSource) table 9 based on and ordered by next fetch time (nextFetchTime) for each managed account type (managedAccountType).

TABLE 9

| DataSource | |
|---|---|
| dataSourceId | int(11), pk, ai |
| managedAccountTypeId | Int(11) |
| clientId | Int(11) |
| active | tinyint |

A crawl status history (CrawlStatusHistory) table 10 in the content database may be modified to include data source ID (dataSourceId) and managed account endpoint ID (managedAccountEndpointId).

TABLE 10

| CrawlStatusHistory | |
| --- | --- |
| dataSourceId | int(11), pk, ai |
| managedAccountEndpointId | Int(11) |

A blog post (BlogPost) table 11 in the content database may be modified to include client ID (clientId) and managed account type ID (managedAccountTypeId).

TABLE 11

| BlogPost | |
| --- | --- |
| clientId | int(11) |
| managedAccountTypeId | |

A Sphinx index data (SphinxIndexData) table 12 in the content database may also be modified to include client ID (clientId) and managed account type ID (managedAccountTypeId).

TABLE 12

| SphinxIndexData | |
| --- | --- |
| clientId | int(11) |
| managedAccountTypeId | int(11) |

Regarding class details, an interface managed account queue client (IManagedAccountQueueClient) table 13 in the content database may be modified to include the interface for clients to access the schedule queue.

TABLE 13

| IManagedAccountQueueClient |
| --- |
| The interface for clients to access the schedule queue |

A managed account queue client factory (ManagedAccountQueueClientFactory) table 14 in the content database may be modified to include a factory class to create a managed account queue client (ManagedAccountQueueClient) class based on a string loaded from service properties.

TABLE 14

| ManagedAccountQueueClientFactory |
| --- |
| A factory class to create a ManagedAccountQueueClient class based on a string loaded from service properties |

A scheduling managed account queue client (RedisManagedAccountQueueClient) table 15 in the content database may be modified to include an implementation of the interface managed account queue client (IManagedAccountQueueClient) interface used to pull scheduled objects from a Redis instance.

TABLE 15

| RedisManagedAccountQueueClient |
| --- |
| An implementation of the IManagedAccountQueueClient interface used to pull scheduled objects from a Redis instance. Configuration of this client will come from a redis.config file. |

An interface managed account endpoint processor (IManagedAccountEndPointProcessor) table 16 in the content database may be modified to include the interface for managed account endpoint processor classes.

TABLE 16

| IManagedAccountEndPointProcessor |
| --- |
| The interface for ManagedAccountEndPointProcessor classes |

A managed account endpoint processor factory (ManagedAccountEndPointProcessorFactory) table 17 in the content database may be modified to include a factory class to create instances of managed account endpoint processor classes.

TABLE 17

| ManagedAccountEndPointProcessorFactory |
| --- |
| A factory class to create instances of ManagedAccountEndPointProcessor classes. The getProcessor method will return an implementation of the ManagedAccountEndPointProcessor class based on a ManagedAccountEndPoint. |

A linked in company update endpoint processor (LinkedInCompanyUpdateEndPointProcessor) table 18 in the content database may be modified to include an implementation of managed account endpoint processor class used to fetch content from the wall post LinkedIn API endpoint.

TABLE 18

| LinkedInCompanyUpdateEndPointProcessor |
| --- |
| An implementation of ManagedAccountEndPointProcessor class used to fetch content from the wall post LinkedIn API endpoint. |

An interface managed account endpoint blog adapter (IManagedAccountEndPointBlogAdapter) table 19 in the content database may be modified to include the interface for managed account end blog adapter classes.

TABLE 19

| ManagedAccountEndPointBlogAdapter |
| --- |
| The interface for ManagedAccountEndBlogAdapter classes |

A managed account endpoint blog adapter factory (ManagedAccountEndpointBlogAdapterFactory) table 20 in the content database may be modified to include a factory class to create instances of managed account endpoint blog adapter classes.

TABLE 20

| ManagedAccountEndpointBlogAdapterFactory |
| --- |
| A factory class to create instances of ManagedAccountEndPointBlogAdapter classes. The getParsingAdpater method will return an implementation of the ManagedAccountEndPointBlogAdapter interface based on a ManagedAccountEndPoint. |

A Linked In company update blog adapter (LinkedInCompanyUpdateBlogAdapter) table 21 in the content database may be modified to include an implementation of managed account endpoint blog adapter used to parse responses from the wall post LinkedIn API endpoint.

TABLE 21

LinkedInCompanyUpdateBlogAdapter

An implementation of ManagedAccountEndPointBlogAdapter used to parse responses from the wall post LinkedIn API endpoint.

Implementations of the disclosed subject matter described above may be provided with hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter.

Implementations may also be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method for setting a schedule of a crawl of a content from a social network, the method comprising:
   parsing, by a processor, the content into a first portion and a second portion, the first portion being associated with a content in a post to the social network, the second portion being associated with a content produced in response to the post;
   determining, by the processor, whether the social network is a first type or a second type;
   updating, by the processor and in response to a determination that the social network is the first type, an active engagement table to cause the processor to refrain from fetching the content produced in response to the post until the processor updates a next fetch time in response to a determination that a new content produced in response to the post is available; and
   setting, by the processor, the schedule according to a type of the social network, the type being the first type or the second type.

2. The method of claim 1, wherein the content produced in response to the post comprises at least one of a comment or a reply.

3. The method of claim 1, wherein the first type comprises:
   a social network with an interface to facilitate sharing of files among accounts determined to be associated with a specific group; or
   a social network configured to enable a first account to send a request to a second account to establish a connection between the first account and the second account.

4. The method of claim 1, wherein the second type comprises:
   a social network with an interface to facilitate sharing of files among accounts determined to be associated with a specific group; or
   a social network configured to enable a first account to send a request to a second account to establish a connection between the first account and the second account.

5. The method of claim 1, further comprising rescheduling, by the processor and in response to a determination that the social network is the second type, the crawl of the content of the social network in accordance with a check rate.

6. The method of claim 5, further comprising:
   causing, by the processor, a first thread to obtain a first endpoint object from a data source object, the data source object related to the post to the social network; and
   updating, by the processor and in response to a determination that the social network is the first type, a data source endpoint record for the first thread with the next fetch time.

7. The method of claim 6, further comprising causing, by the processor, a second thread to obtain a second endpoint object from an active engagement object, wherein:
   the active engagement object is related to the content produced in response to the post; and
   the updating the active engagement table to cause the processor to refrain from fetching the content comprises updating the active engagement table for the second thread with a value that causes the processor to refrain from fetching the content.

8. The method of claim 7, wherein:
   the causing the second thread to obtain the second endpoint object comprises causing a plurality of second threads to obtain a plurality of second endpoint objects; and
   the rescheduling the crawl of the content produced in response to the post comprises rescheduling crawls, based on the plurality of second endpoint objects, of content produced in response in posts to occur during a same interval.

9. The method of claim 1, further comprising sending, by the processor to a scheduling queue, the schedule of the crawl of the content from the social network.

10. The method of claim 9, wherein the scheduling queue comprises:
   a first queue for the first type; and
   a second queue for the second type.

11. The method of claim 9, wherein the scheduling queue comprises:
   a first queue for the content in the post to the social network; and
   a second queue for the content produced in response to the post.

12. The method of claim 1, further comprising adjusting, by the processor, the schedule in response to a determination that the social network implements user-based rate limits.

13. The method of claim 12, wherein the adjusting comprises:
   querying the active engagement table by identification;
   grouping results of a query of the engagement table by a check rate identification;
   summing at least one group of the results by the check rate identification to determine a total number of records for each check rate; and
   estimating a total number of application programming interface calls needed to service the schedule based on sums for the each check rate.

14. The method of claim 12, further comprising querying, by the processor, a dynamics ADS active table in conjunction with rescheduling the crawl of the content produced in response to the post.

15. The method of claim 1, further comprising initiating, by the processor, a thread to look for notification-type records to be used to modify the schedule.

16. The method of claim 1, further comprising causing, by the processor, a communication with a throttling manager to determine a location to obtain a token for use in effecting a request, via an application programming interface, with the social network.

17. The method of claim 16, further comprising receiving, by the processor and from the throttling manager, an information object with an instruction to obtain the token.

18. The method of claim 1, further comprising modifying, by processor, an ADS lookup service to periodically poll a user database for new accounts to include in a data source table.

19. A non-transitory computer-readable medium storing computer code for setting a schedule of a crawl of a content from a social network, the computer code including instructions to cause the processor to:
   parse the content into a first portion and a second portion, the first portion being associated with a content in a post to the social network, the second portion being associated with a content produced in response to the post;
   determine whether the social network is a first type or a second type;
   update, in response to a determination that the social network is the first type, an active engagement table to cause the processor to refrain from fetching the content produced in response to the post until the processor updates a next fetch time in response to a determination that a new content produced in response to the post is available; and
   set the schedule according to a type of the social network, the type being the first type or the second type.

20. A system for setting a schedule of a crawl of a content from a social network, comprising:
   a memory configured to store the content and an active engagement table; and
   a processor configured to:
      parse the content into a first portion and a second portion, the first portion being associated with a content in a post to the social network, the second portion being associated with a content produced in response to the post;
      determine whether the social network is a first type or a second type;
      update, in response to a determination that the social network is the first type, the active engagement table to cause the processor to refrain from fetching the content produced in response to the post until the processor updates a next fetch time in response to a determination that a new content produced in response to the post is available; and
      set the schedule according to a type of the social network, the type being the first type or the second type.

* * * * *